UNITED STATES PATENT OFFICE.

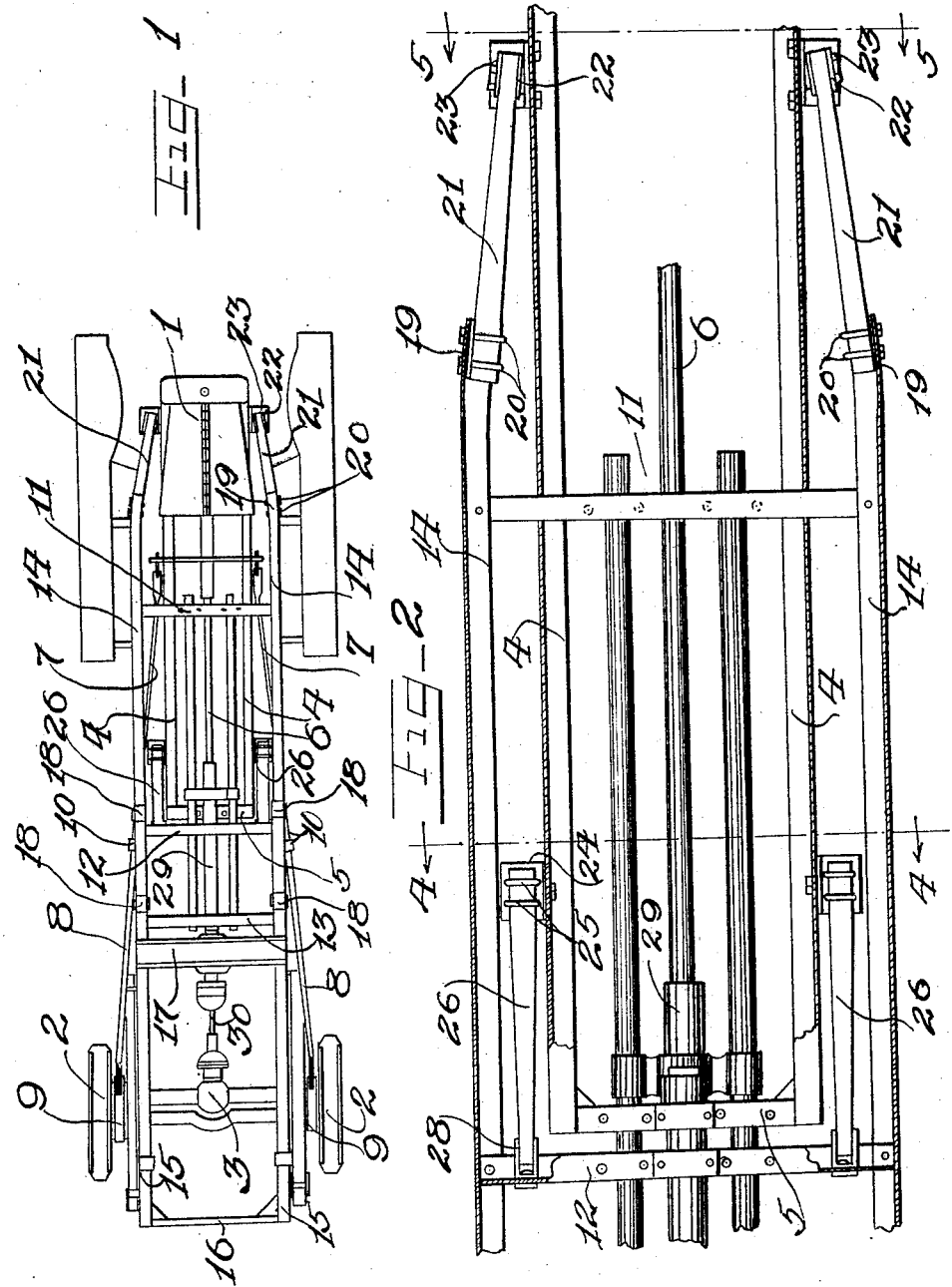

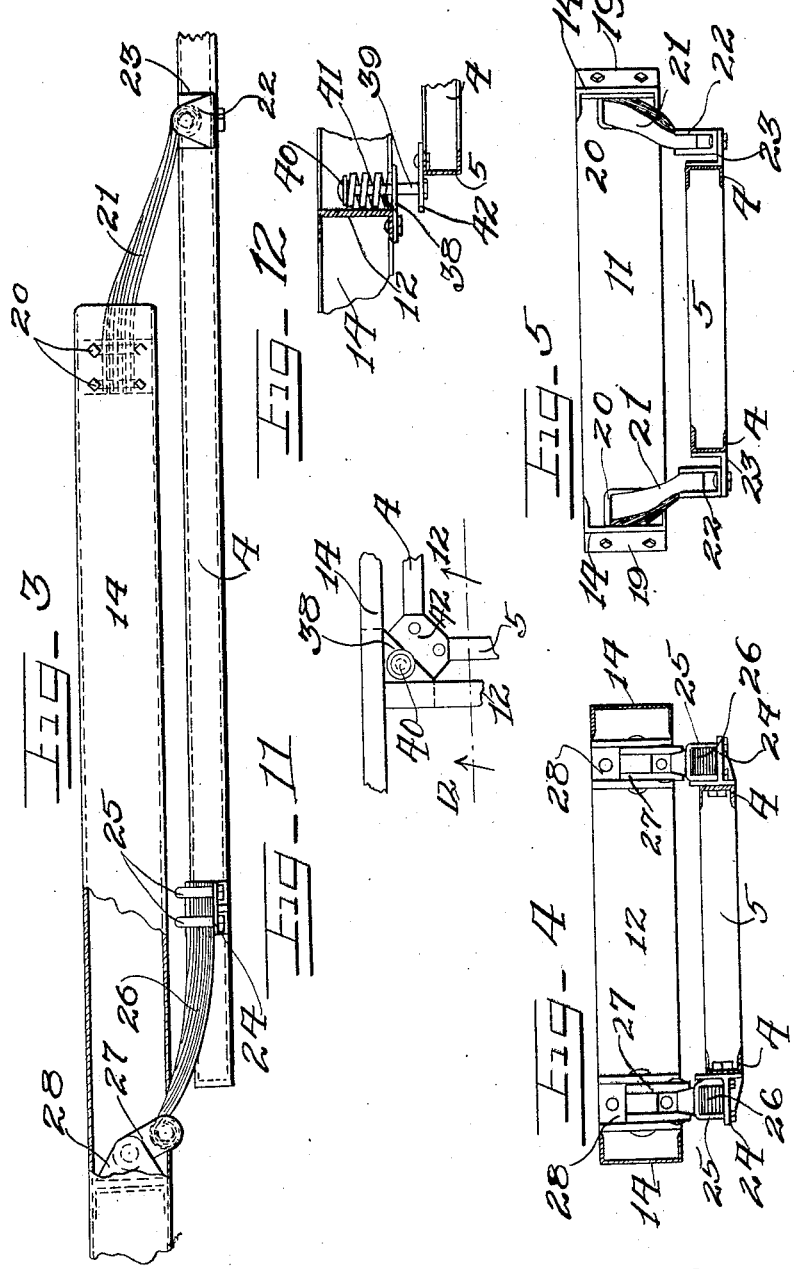

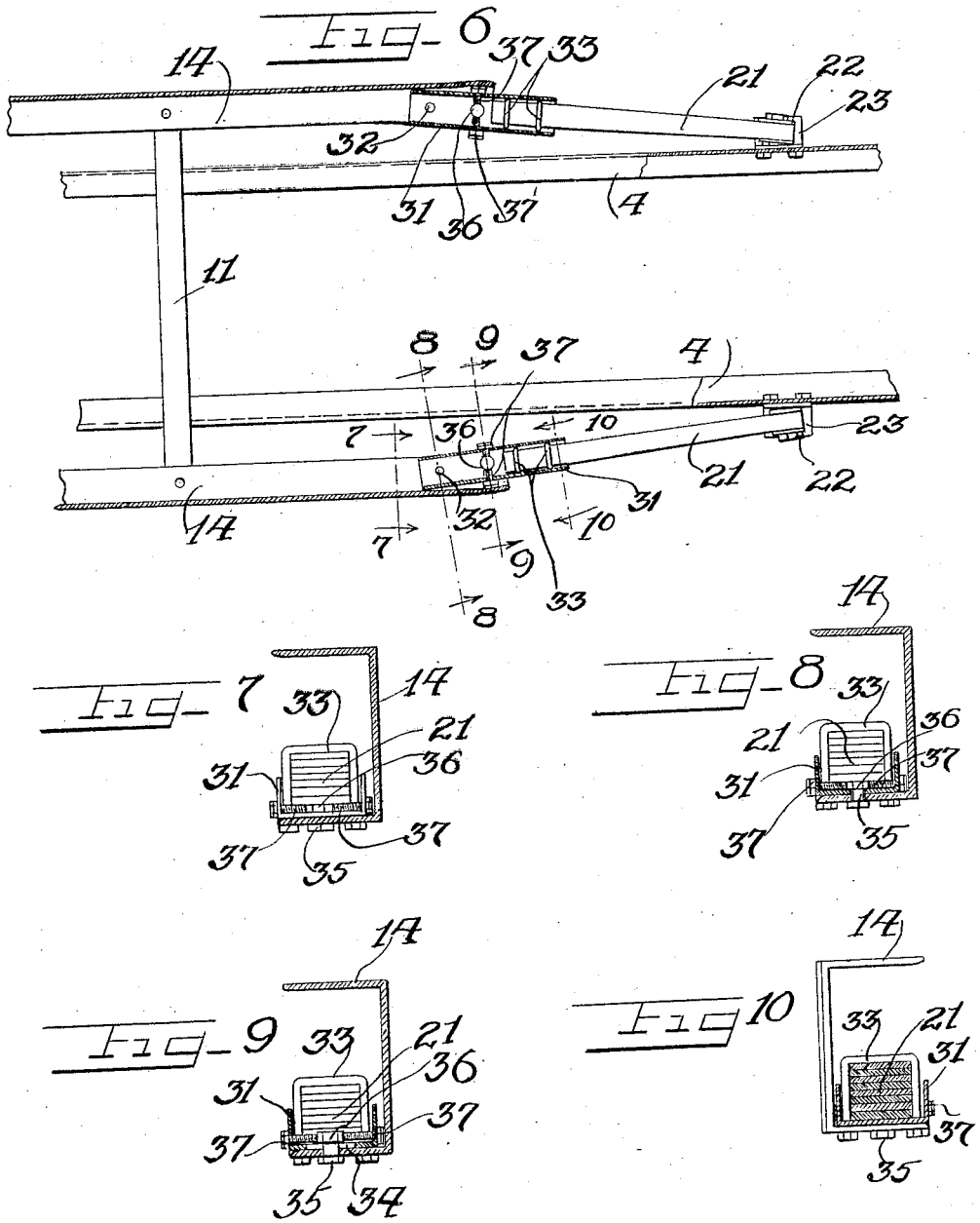

ALBERT EUGENE COOK, OF EVANSTON, AND THOMAS VAN TUYL, OF KANKAKEE, ILLINOIS; SAID VAN TUYL ASSIGNOR TO SAID COOK.

SPRING-MOUNTED TRACTOR ATTACHMENT.

1,417,799.  Specification of Letters Patent.  Patented May 30, 1922.

Application filed November 10, 1919. Serial No. 336,808.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in a Spring-Mounted Tractor Attachment; and we do hereby declare that the following is a full, clear, and exact description of the same, reference being had to the accompanying drawings, and to the numerals of reference marked thereon, which form a part of this specification.

This invention relates more particularly to a tractor or truck attachment adapted to be mounted on the chassis frame of a motor vehicle by spring mechanisms.

It is an object of this invention to provide a spring mounted tractor or truck attachment.

It is also an object of the invention to attach an auxiliary frame to a vehicle chassis frame by means of resilient members.

Another object of the invention is to provide spring connecting members adapted to permit an auxiliary frame to be attached to a main frame.

A further object of this invention is to connect an adjustable tractor attachment frame to a vehicle frame by spring members to relieve the automobile power mechanisms of shocks and stresses applied to the tractor attachment.

It is an important object of this invention to secure a tractor or truck attachment to the chassis frame of an automobile by spring mechanisms connecting the sills of the chassis and tractor frames.

Other and further important objects of this invention will be apparent from the disclosures in the specification and drawings.

The invention (in a preferred form) is illustrated in the drawings and hereinafter more fully described.

On the drawings:

Figure 1 is a top plan view of an automobile chassis having a spring mounted tractor attachment attached thereto and embodying the principles of this invention.

Figure 2 is an enlarged sectional plan view showing the spring members which connect the frames, and modified by showing the tractor frame attached to the auto frame more to the rear of the front axle.

Figure 3 is an enlarged fragmentary side elevation of the view shown in Figure 2.

Figure 4 is a sectional view taken on line 4—4, of Figure 2.

Figure 5 is a sectional view taken on line 5—5, of Figure 2.

Figure 6 is a fragmentary sectional plan view of a portion of a modified form of the device.

Figure 7 is an enlarged detail section taken on line 7—7, of Figure 6.

Figure 8 is an enlarged detail section taken on line 8—8, of Figure 6.

Figure 9 is an enlarged detail section taken on line 9—9, of Figure 6.

Figure 10 is an enlarged detail section taken on line 10—10, of Figure 6.

Figure 11 is a fragmentary plan view of a modified form of spring mounting.

Figure 12 is a section taken on line 12—12, of Figure 11.

As shown on the drawings:

The reference numeral 1, indicates an automobile provided with rear wheels 2, a rear driving mechanism 3 and a chassis frame embracing sills 4, and a rear cross member 5. The regular automobile driving shaft 6, is tubular and of rectangular cross-section. The automobile brake rods are indicated by the reference numeral 7, and are adjustably connected with brake tubes 8, the rear ends of which are connected to the rear automobile brakes 9. Clamping members 10, are provided for holding the brake rods locked in an adjusted position with respect to the brake tubes 8.

The automobile rear wheels 2, and the rear driving or differential mechanism 3, are supported near the rear end of an extensible truck or tractor frame. The extensible or auxiliary frame comprises two adjustable connected telescoping sections. The front section embraces a plurality of parallel cross bars 11, 12 and 13, the ends of which are rigidly secured to channel sills 14.

The tractor frame section comprises channel sills 15, the rear ends of which are rigidly connected together by a cross bar or brace 16. A transverse brace 17, is used to connect the sills 15, near their front ends.

The front sills 14, telescope into the rear sills 15, and are adapted to be locked therewith by locking devices 18.

The auxiliary frame sills 14, are disposed above and to the outside of the chassis sills 4. The front end of each channel frame sill 14, is bent inwardly at 19, and has rigidly secured thereto by staple bolts 20, the upper heavy end of a leaf spring 21. The lower or front end of the leaf spring 21, is attached to a pin supported between the upright flanges of a U-shaped socket or yoke 22. The yoke 22, is rigidly secured to an angle bracket 23, fastened to the outer side of the chassis sill 4. As shown in Figure 1, this attachment with the chassis is near the front axle, in Figure 2 the attachment is effected farther to the rear, though of course the attachment with the chassis may be at any point sufficiently forward to afford requisite strength and proper load disposition.

Rigidly mounted to the outer side near the rear end of each chassis sill 4, is a bracket 24, to which is rigidly secured by means of staple bolts 25, the lower heavy end of a leaf spring 26. The upper tapered end of the spring 26, is attached to a pin which is supported by the flanges of a channel link 27. The channel link 27, has the upper end thereof pivotally connected to the flanges of a mounting bracket 28, which is rigidly secured to the cross brace 12, adjacent one of the auxiliary frame sills 14.

Supported below the cross bars 12 and 13, is a driving shaft 29, provided with a rectangular passage for slidably receiving the main shaft 6. A universal coupling 30, connects the rear shaft 29, with the automobile differential 3.

Figures 6 to 10, inclusive, disclose a modified form of connecting the upper ends of the springs 21, to the auxiliary frame sills 14. In this case an adjustable channel connector or arm 31, has the rear end portion pivotally attached to the front end of the sill 14, by means of a pin 32. The other or front end of the channel arm 31, projects beyond the front end of the sill 14, and has rigidly secured thereto by means of staple bolts 33, the upper heavy end of the leaf spring 21. A transverse slot 34, is provided in the bottom of the channel arm 31. As shown in Figure 9, a bolt or pin 35, is rigidly secured to the sill 14, and projects upwardly through the slot 34. A head 36, is formed on the upper end of the bolt 35. Adjusting screws 37, are threaded through the flanges of the arm 31, and are adapted to be adjusted to engage the stationary bolt 35, to cause the arm 31, to adjustably swing on its pivot pin 32.

Figures 11 and 12, disclose a modified form of spring mounting. Rigidly secured to the bottom flanges of the cross brace 12 and the sill 14, is a gusset plate 38, provided with an opening through which a suspension bolt 39, projects. A head 40, is formed on the upper end of the bolt 39, and has bearing thereagainst the upper end of a spring 41, which is coiled around the bolt. The lower end of the coiled spring 41, rests upon the gusset plate 38. The lower end of the bolt 39, projects through an opening provided in a projecting plate 42, which is riveted or otherwise secured at the junction of the chassis frame members 4 and 5.

The operation is as follows:

As clearly shown in Figures 1 and 2, the truck or tractor attachment has the front portion of the frame thereof connected with the automobile chassis frame sills 4, by the springs 21 and 26. This spring suspension connecting the automobile chassis frame with the auxiliary truck or tractor frame, affords an arrangement whereby the power mechanisms mounted on the automobile chassis frame, are practically relieved from all the jars and stresses to which the rear driving mechanisms are subjected.

Figure 6 discloses an arrangement whereby the springs 21, are adapted to be adjustably connected with the sills 14, by means of the pivoted arms 31, and the adjusting screws 37. The slots 34, in the arms 31, permit a swinging adjustment of the arms when the screws 37, are adjusted. It will be understood that the adjustable arrangement for connecting the springs 21, to the sills 14, may be used in combination with the device as shown in Figure 2, or with the modified spring suspension arrangement disclosed in Figures 11 and 12.

The important feature of this invention is the arrangement whereby the automobile chassis frame is suspended from the auxiliary truck or tractor frame by spring mechanisms, to afford an easy riding vehicle and one in which the shocks and stresses applied to the rear driving mechanisms are greatly reduced before they are transmitted to the automobile chassis frame and the power mechanisms.

We are aware that numerous details of construction may be carried through a wide range without departing from the principles of this invention, and we therefore do not purpose limiting the patent granted otherwise than necessitated by the prior art.

We claim as our invention:

1. The combination with automobile chassis frame sills, of auxiliary frame sills, a brace member rigidly connecting said auxiliary frame sills, spring mechanisms connecting said chassis frame sills to said auxiliary frame sills, and spring devices connecting said chassis frame sill to said auxiliary frame brace members.

2. The combination with an automobile chassis frame, of a truck frame, members pivotally mounted on said truck frame, means for adjusting said members, and springs attached to said members and to said automobile chassis frame.

3. The combination with an automobile chassis frame, of a truck frame, slotted members pivotally mounted on said truck frame, springs connecting said slotted members to said chassis frame, bolts secured to said truck frame and projecting upwardly through the slots in said slotted members, and screws on said slotted members contacting said bolts, said screws adapted to be adjusted to cause adjustment of said slotted members and the springs connected therewith.

4. A vehicle frame mechanism comprising a main frame, an auxiliary frame positioned thereabove, channel members pivoted to said auxiliary frame having slots therein, bolts secured to said auxiliary frame projecting through said slots, springs connected to said channel members and to said main frame, and screws supported on said channel members contacting said bolts, said screws adapted to be adjusted to cause said channel members to be adjusted.

In testimony whereof we have hereunto subscribed our names in the presence of two subscribing witnesses.

ALBERT EUGENE COOK.
THOMAS VAN TUYL.

Witnesses:
 EARL M. HARDINE,
 CHARLES W. HILLS, Jr.